(12) United States Patent
Williams

(10) Patent No.: US 12,147,325 B2
(45) Date of Patent: Nov. 19, 2024

(54) DIAGNOSTIC DATA CAPTURE

(71) Applicant: ARM LIMITED, Cambridge (GB)

(72) Inventor: Michael John Williams, Ely (GB)

(73) Assignee: Arm Limited, Cambridge (GB)

(*) Notice: Subject to any disclaimer, the term of this patent is extended or adjusted under 35 U.S.C. 154(b) by 755 days.

(21) Appl. No.: 16/305,184

(22) PCT Filed: May 15, 2017

(86) PCT No.: PCT/GB2017/051346
§ 371 (c)(1),
(2) Date: Nov. 28, 2018

(87) PCT Pub. No.: WO2018/002572
PCT Pub. Date: Jan. 4, 2018

(65) Prior Publication Data
US 2019/0340097 A1    Nov. 7, 2019

(30) Foreign Application Priority Data
Jun. 29, 2016 (GB) .................. 1611261

(51) Int. Cl.
*G06F 11/34* (2006.01)
*G06F 11/30* (2006.01)
(Continued)

(52) U.S. Cl.
CPC ...... *G06F 11/3495* (2013.01); *G06F 11/3024* (2013.01); *G06F 11/3072* (2013.01);
(Continued)

(58) Field of Classification Search
CPC ............. G06F 11/3072; G06F 11/3476; G06F 11/3024; G06F 11/3452; G06F 11/3471;
(Continued)

(56) References Cited

U.S. PATENT DOCUMENTS 6,237,073 B1    5/2001 Dean et al.
9,449,314 B2*   9/2016 Heller ............... G06Q 20/1235
(Continued)

FOREIGN PATENT DOCUMENTS

CN      104169886      11/2014
EP      2 873 983       5/2015
(Continued)

OTHER PUBLICATIONS

Wikipedia, "Network on a chip", Apr. 13, 2016, Wikipedia, pp. 1-3 (Year: 2016).*
(Continued)

*Primary Examiner* — Bryce P Bonzo
*Assistant Examiner* — Michael Xu
(74) *Attorney, Agent, or Firm* — NIXON & VANDERHYE P.C.

(57) ABSTRACT

Statistical sampling of diagnostic data within an apparatus for processing data 2 is performed based upon sample interval monitoring and address monitoring. A program instruction has its diagnostic data stored when it meets a sample interval criteria and an address match criteria. The address match may correspond to an instruction address of the program instruction or a target address to be read or written by the program instruction.

14 Claims, 4 Drawing Sheets

(51) Int. Cl.
*G06F 11/36* (2006.01)
*G06F 12/06* (2006.01)

(52) U.S. Cl.
CPC ...... *G06F 11/3452* (2013.01); *G06F 11/3466* (2013.01); *G06F 11/3471* (2013.01); *G06F 11/3476* (2013.01); *G06F 11/3636* (2013.01); *G06F 12/06* (2013.01)

(58) Field of Classification Search
CPC .. G06F 11/3495; G06F 11/3636; G06F 12/06; G06F 11/3466
See application file for complete search history.

(56) References Cited

U.S. PATENT DOCUMENTS

| | | | |
|---|---|---|---|
| 9,619,358 B1* | 4/2017 | Cai | G06F 9/44 |
| 2003/0229823 A1 | 12/2003 | Swaine et al. | |
| 2004/0030962 A1* | 2/2004 | Swaine | G06F 11/3636 |
| | | | 714/45 |
| 2004/0187117 A1* | 9/2004 | Orion | G06F 9/4812 |
| | | | 718/100 |
| 2005/0183063 A1 | 8/2005 | Wolczko et al. | |
| 2006/0242517 A1 | 10/2006 | Pedley et al. | |
| 2008/0155274 A1 | 6/2008 | Martinez et al. | |
| 2008/0196013 A1* | 8/2008 | Sim | G06F 11/3636 |
| | | | 717/129 |
| 2012/0066552 A1* | 3/2012 | Gilkerson | G06F 11/348 |
| | | | 714/45 |
| 2013/0246746 A1* | 9/2013 | Gainey, Jr. | G06F 11/3636 |
| | | | 712/205 |
| 2013/0246754 A1* | 9/2013 | Bradbury | G06F 11/3644 |
| | | | 712/E9.016 |
| 2013/0297975 A1* | 11/2013 | Kilzer | G06F 11/3636 |
| | | | 714/38.13 |
| 2014/0081936 A1 | 3/2014 | Blainey et al. | |
| 2014/0195786 A1* | 7/2014 | Gilkerson | G06F 9/30145 |
| | | | 712/227 |
| 2015/0143343 A1* | 5/2015 | Weiss | G01R 31/31705 |
| | | | 717/128 |
| 2017/0004063 A1* | 1/2017 | Broderick | G06F 11/3495 |
| 2017/0054609 A1* | 2/2017 | Chetan | H04L 41/147 |
| 2017/0255485 A1* | 9/2017 | Gamoneda | G06F 11/3648 |

FOREIGN PATENT DOCUMENTS

| | | |
|---|---|---|
| GB | 2483509 | 3/2012 |
| JP | 62-97044 | 5/1987 |
| JP | 2001-5689 | 1/2001 |
| JP | 2007-213205 | 8/2007 |
| JP | 2015-513374 | 5/2015 |
| TW | 200627264 | 8/2006 |

OTHER PUBLICATIONS

Breakpoint—Wikipedia, the free encyclopedia—Apr. 2016 (Year: 2016).*
International Search Report and Written Opinion of the ISA for PCT/GB2017/051346, mailed Jul. 25, 2017, 12 pages.
Combined Search and Examination Report for GB Application No. 1611261.7, mailed Dec. 9, 2016, 7 pages.
Office Action for KR Application No. 10-2019-7002034 dated Dec. 24, 2020 and English translation, 15 pages.
Office Action for TW Application No. 106120553 dated Mar. 24, 2021 and English translation, 18 pages.
Office Action for JP Application No. 2018-567249 dated May 7, 2021 and English translation, 7 pages.
Final Office Action for JP Application No. 2018-567249 mailed Dec. 2, 2021 and English translation, 4 pages.
Office Action for CN Application No. 201780038905.X dated Jan. 28, 2023, 3 pages.
First Office Action for CN Application No. 201780038905.X dated Jun. 15, 2022 and English translation, 34 pages.

* cited by examiner

DIAGNOSTIC DATA CAPTURE

This application is the U.S. national phase of International Application No. PCT/GB2017/051346 filed May 15, 2017 which designated the U.S. and claims priority to GB 1611261.7 filed Jun. 29, 2016, the entire contents of each of which are hereby incorporated by reference.

This disclosure relates to the field of data processing systems. More particularly, this disclosure relates to the capture of diagnostic data within data processing systems.

An important feature of increasingly complex data processing systems is that they include mechanisms and support for capturing diagnostic data in order that errors in the hardware and software can be identified and solved. It is desirable that the capture of diagnostic data should not disturb the normal operation of the data processing system. For example, if capturing the diagnostic data significantly slowed the operation of the data processing system, then this could result in some speed related errors either not arising during the capture of the diagnostic data when they arise in normal use or arising during the capturing of the diagnostic data when they would not arise during normal use. Furthermore, it is desirable that the amount of storage and other resources required for capture of diagnostic data should be low as these represent an overhead which would not normally be used during deployed operation of the data processing system when diagnostic data capture is not required.

At least some embodiments of the present disclosure provide apparatus for processing data comprising:

diagnostic data capture circuitry to control storing to a diagnostic data buffer of sampled diagnostic data characterizing a sampled processing operation within a stream of processing operations when:

said sampled processing operation is separated from a preceding sampled processing operation having sampled diagnostic data stored to said diagnostic data buffer by an interval matching a predetermined interval condition; and said sampled processing operation has an associated memory address matching a predetermined address characteristic.

At least some embodiments of the present disclosure provide apparatus for processing data comprising:

diagnostic data capture means for controlling storing to a diagnostic data buffer of sampled diagnostic data characterizing a sampled processing operation within a stream of processing operations when:

said sampled processing operation is separated from a preceding sampled processing operation having sampled diagnostic data stored to said diagnostic data buffer by an interval matching a predetermined interval condition; and said sampled processing operation has an associated memory address matching a predetermined address characteristic.

At least some embodiments of the present disclosure provide a method of processing data comprising:

storing to a diagnostic data buffer of sampled diagnostic data characterizing a sampled processing operation within a stream of processing operations when:

said sampled processing operation is separated from a preceding sampled processing operation having sampled diagnostic data stored to said diagnostic data buffer by an interval matching a predetermined interval condition; and said sampled processing operation has an associated memory address matching a predetermined address characteristic.

Example embodiments will now be described, by way of example only, with reference to the accompanying drawings in which:

FIG. 1 schematically illustrates an example embodiment of a data processing system incorporating diagnostic data capture circuitry;

Figure 1:
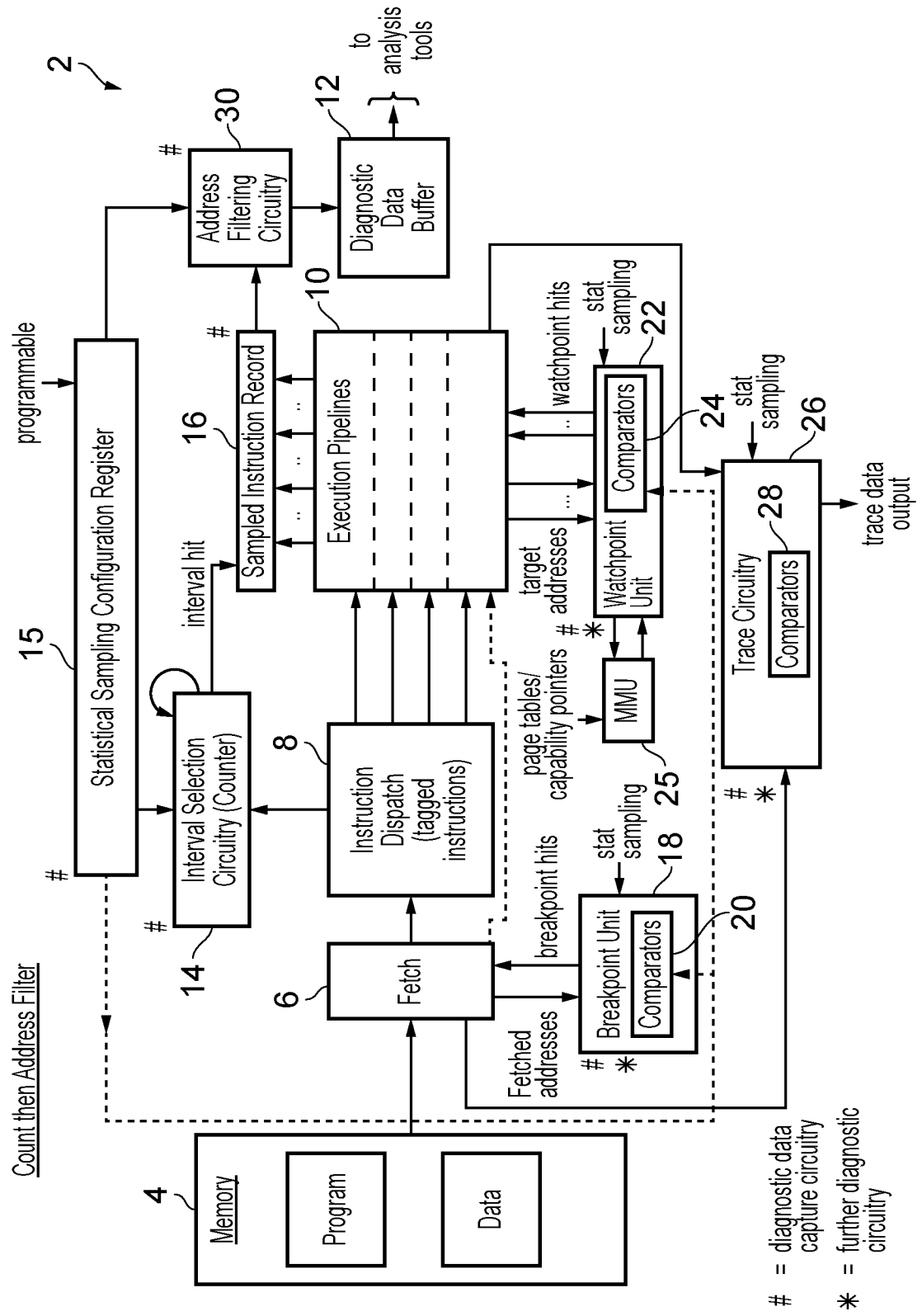

FIG. 1 schematically illustrates a data processing apparatus 2 including a memory 4 (storing program instructions to be executed and data to be manipulated), a fetch unit 6, an instruction dispatch unit 8 and execution pipelines 10. In operation, the fetch unit 6 fetches program instructions from the memory 4. These fetched program instructions are then at least partially decoded (not illustrated) and passed to the instruction dispatch unit 8 where they await dispatch to the execution pipelines 10. The execution pipelines 10 perform the processing operation(s) specified by the program instructions. It will be appreciated that in practice, the data processing apparatus 2 will typically include many further units providing other functionality to the data processing apparatus 2, but these have been omitted from FIG. 1 for the sake of clarity.

The data processing apparatus 2 of FIG. 1 is able to perform statistical sampling of the program instructions which are executed. These program instructions may more generally be considered to be a stream of processing operations. The present techniques could be applied to different embodiments in which the processing operations upon which the statistical sampling to be performed are not program instructions, e.g. the processing operations could be interrupts received by a interrupt controller or memory transactions upon a system-on-chip interconnect.

The statistical sampling performed in accordance with the present disclosure serves to record diagnostic data within a diagnostic data buffer 12. The selection of for which program instructions (processing operations) within the stream the diagnostic data is to be captured is based upon satisfying two criteria. The first criterion is that the program instruction (processing operation) should be separated from a preceding sampled program instruction (processing operation) by an interval (either number of processing operations or time) within the stream of program instructions that matches a predetermined interval condition. In this example embodiment, the predetermined interval condition is that the sampled diagnostic data is separated from a preceding sampled processing operation by a predetermined interval that is an positive integer multiple of a base sampling period. Furthermore, the sample processing operation in order to have its diagnostic data captured should have an associated memory address matching a predetermined address characteristic.

In the example illustrated in FIG. 1, these two criteria are applied in the order of first requiring that a candidate program instruction to be sampled should be separated from the immediately preceding candidate program instruction by a predetermined (programmable) sampling interval. Once the candidate program instructions within the stream of program instructions have been identified based upon the sampling interval, then a further selection is made among these candidate program instructions based upon whether or not the candidate program instructions have an associated memory address matching a predetermined address characteristic.

The associated memory address could take a variety of forms. For example, the associated memory address for a candidate program instruction may be the memory address storing that program instruction within the memory 4. Alternatively, the associated memory address may be a target address accessed by that candidate program instruction when it is executed, e.g. a read address or a write address associated with a data access instruction (load or store) or a data processing instruction (e.g. add) that is executed.

FIG. 1 illustrates interval selection circuitry 14 which is initialized with an interval count value from a programmable statistical sampling configuration register 15. Each time a program instruction is dispatched from the instruction dispatch unit 8, the count value is decremented until it reaches zero. It should be noted that the term "dispatched" can be used in a variety of ways in this technical field and the present techniques are not limited by any particular usage of this term. When the count value reaches zero, then this corresponds to "a sampling interval hit" the corresponding instruction is marked as the sampled one. This might take the form of a tag that travels with the instruction through the pipeline that is examined to determine whether this is the sampled instruction, or a record somewhere of a tag value for the instruction that is compared against tag values of instructions in the pipeline to determine whether this is the sampled instruction, or some combination of these and other means. The execution pipelines 10 then store characteristics of the marked instruction within sampled instruction record storage 16 as the marked instruction makes its way through the execution pipelines 10 until it is completed and retired. Thus, the interval selection circuitry 14 in this example embodiment serves to mark dispatched instructions separated within the stream of program instructions by a programmable sampling interval. In the above described example embodiment the sampling is at the point where the instructions are dispatched. In other example embodiments, the sampling may occur at other points, e.g. before instructions are decoded or when they are issued to the execution units. Not every processing operation separated by an integer multiple of the predetermined interval from the previously sampled processing operation will be sampled (i.e. "a predetermined interval condition"), rather it is a candidate for sampling and will be sampled if it also meets the address criterion discussed below.

As previously mentioned, the associated memory address criteria which is used to filter further which diagnostic data is captured may take the form of the memory address of the program instruction or a target address associated with the program instruction. In the case of the memory address of the program instruction, this may be determined as the fetch unit 6 fetches the program instruction from the memory 4. In the illustrated example embodiment, a breakpoint unit 18 is provided, which is an example of further diagnostic circuitry performing diagnostic operations distinct from the statistical sampling previously discussed. Comparators 20 within the breakpoint unit 18 which may be used by the breakpoint unit 18 to identify the instruction addresses of fetched instructions to trigger an interrupt in processing in accordance with break-pointing of program code, may be reused to serve as comparators identifying whether a fetched program instruction has an associated memory address (i.e. the program instruction address) matching a predetermined address characteristic used for the address filtering criteria of statistical sampling. The breakpoint unit 18 may be programmed to serve as part of the statistical sampling diagnostic data capture circuitry instead of having its normal breakpoint identification function. In this case, when the comparators 20 within the breakpoint unit 18 detect an address match, which may be a full match of the instruction address against a predetermined address, a match corresponding to the instruction address falling within a predetermined range of addresses, or a match whereby one or more bits or bit fields within the associated memory address as specified by a mask (e.g. a mask value specifying a number of bits to be treated as significant by the matching circuitry) match with a predetermined address. Other types of address matching may also be used if desired and supported by the comparators 20. Reusing the comparators 20 within the breakpoint unit 18 rather than providing dedicated comparators to support the address comparison associated with statistical sampling reduces the overhead associated with the provision of statistical sampling.

If an address match is identified by the comparators 20 when these are being used to support statistical sampling, then the program instruction which has resulted in the match is tagged to indicate this as it is passed to the instruction dispatch unit 8. When that instruction is then dispatched to the execution pipelines, then the tag indicating that it corresponds to an address match is stored within the sampled instruction record for that instruction in the sampled instruction record storage 16 such that this information is available when the instruction is completed so a determination (described below) can be made as to whether or not its diagnostic data should be stored within the diagnostic data buffer 12.

As previously mentioned, the associated memory address of a program instruction may be a target address associated with a program instruction. A watchpoint unit 22 which is used to perform data watch-pointing in accordance with a diagnostic technique separate from statistical sampling, may be reused, or at least its comparators 24 reused, in order to identify that a program instruction to be subject to statistical sampling has the predetermined address characteristic by virtue of accessing a target address having predetermined address characteristics. As previously discussed, these characteristics may require a complete match of the address, a match corresponding to the target address falling within a predetermined range, or a match between a partially masked target address value and a predetermined value. Other forms of address matching would also be possible. The watchpoint unit 22 is supplied with target address data by the execution pipelines 10 and the comparators 24 within the watchpoint unit 22 may be used to identify whether a program instruction matches a predetermined address criteria. If such a match arises, then this may be signaled back via the execution pipelines 10 and stored within the sampled instruction record within the sampled instruction record storage 16 for that program instruction.

Address matching may also be performed based upon memory address attribute data indicative of memory attributes associated with regions of memory addresses within the memory 4. Such memory address attribute data may be page table data used by a memory management unit 25 to control access to the memory 4, either by instructions specifying loads or stores, or by the fetching of program instructions by the fetch unit 6 from given regions of the memory 4. The memory attribute data may be page table data to which can be added a flag indicating that a particular page of memory corresponds to an address match for the predetermined address characteristic associated with the statistical sampling, e.g. a candidate program instruction at the required interval will be sampled if it is associated with a memory address from within a page of the memory address space marked by the page tables as to be subject to statistical sampling.

As previously discussed, both the breakpoint unit 18 and the watchpoint unit 22 may have their respective address comparators 20, 24 reused to serve as part of the diagnostic data capture circuitry which performs statistical sampling. When they are being reused in this way, their normal function to trigger an interruption to processing when they detect a breakpoint or a watchpoint is programmably suppressed and instead they generate a suppressed address-match event which corresponds to the satisfying of the address matching between an associated memory address of a candidate program instruction and the predetermined address characteristic for statistical sampling.

The data processing apparatus 2 may also include trace circuitry 26 to generate trace data indicative of program execution flow. This trace circuitry 26 includes comparators 28 used during such tracing operations. These comparators 28 may again be reused as part of the diagnostic data capture circuitry which performs statistical sampling in order to reduce the overhead associated with the provision of such statistical sampling.

As mentioned above, page table data may be used to identify regions of memory addresses which are to be subject to statistical sampling (i.e. for which an address match is indicated). It is also possible that in some embodiments a capability pointer may be used as a pointer to a region of memory and specify permitted operations when using that pointer. Such a capability pointer may be augmented by a flag indicating that the region concerned should be subject to statistical sampling, i.e. provide the address matching criteria.

When a marked program instruction is being retired from the execution pipelines 10 ("retired" could in different example embodiments, refer to different points such as when the effect of the instruction is committed to the architectural state (becomes non-speculative), when it is completed and can no longer effect other instructions (but is still speculative), when the instruction no longer has anything to record in the sample record, or some other point), then its sampled instruction record stored within the sampled instruction record storage 16 is checked to determine whether or not diagnostic data associated with that program instruction should be stored within the diagnostic data buffer 12. Address filtering circuitry 30 is used to check whether the address match flag is set within the sampled instruction record. If the address match flag is set indicating that the address match criteria have been met, then diagnostic data for that sampled instruction is stored within the diagnostic data buffer 12.

In the example of FIG. 1, candidate program instructions to be sampled are identified using the sampling interval. A selection amongst these candidate program instructions is then made based upon whether or not they have an associated memory address matching a predetermined address characteristic. Thus, the operation of the circuitry of FIG. 1 may be considered to perform statistical sampling based upon a count filter and then an address filter.

Figure 2:
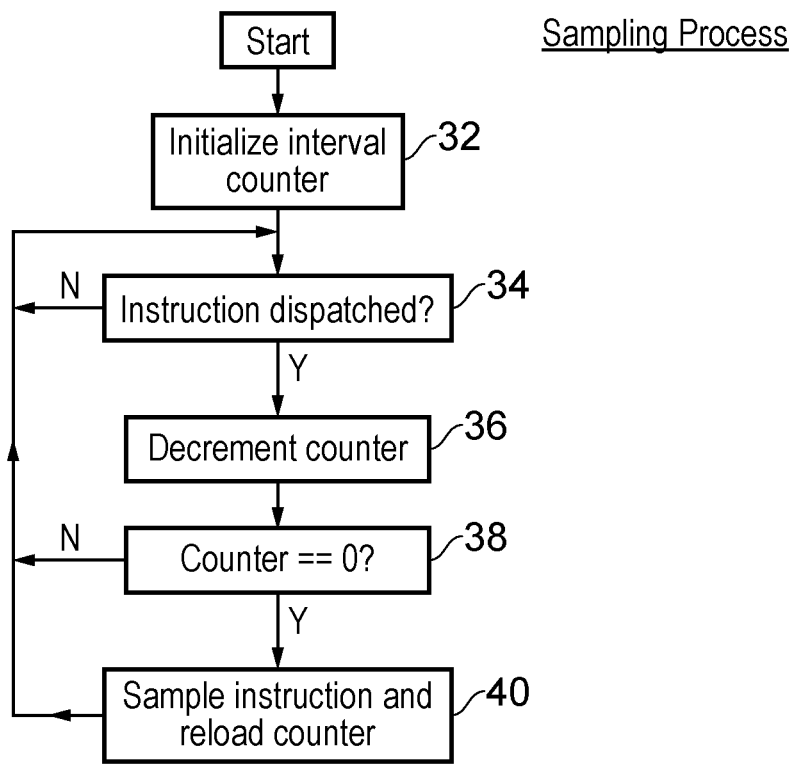
FIG. 2 is a flow diagram schematically illustrating a sampling process.

FIG. 2 schematically illustrates an interval sampling process. At step 32 the counter within the interval selection circuitry 14 is initialized to a count value corresponding to the sampling interval. Step 34 then waits until an instruction is identified as being dispatched by the instruction dispatch unit 8. When an instruction is dispatched, then step 36 decrements the counter. Step 38 determines whether the counter has reached zero. When the counter reaches zero, then step 40 marks the instruction as meeting the sample interval criteria and processing returns to step 34.

Figure 3:
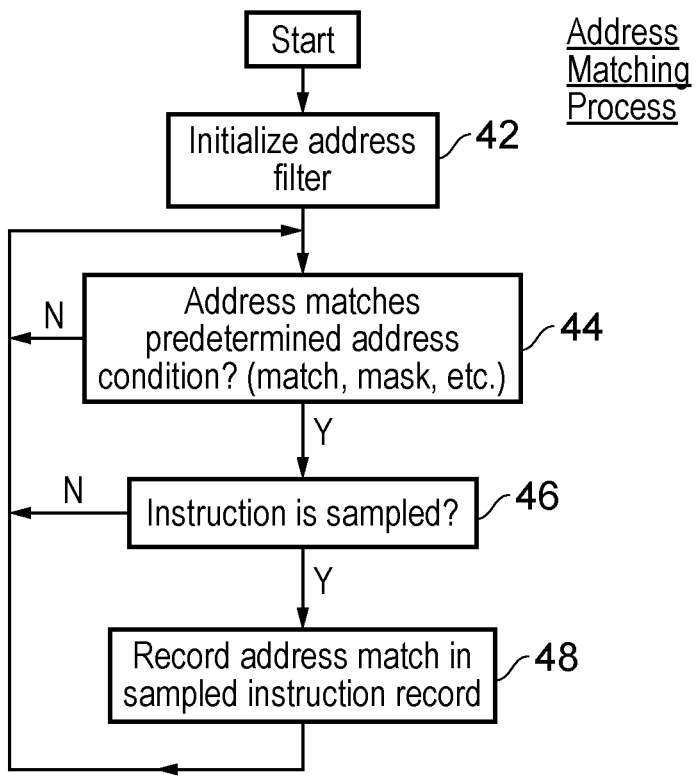
FIG. 3 is a flow diagram schematically illustrating an address matching process.

FIG. 3 schematically illustrates the address matching process. At step 42 the address filter is initialized, e.g. appropriate programming of the comparators 20, 24, 28 or specific comparators dedicated to the statistical sampling. Step 44 then determines whether or not an address associated with a program instruction matches the predetermined address condition (such as, for example, an exact match, a match within a range or a match subject to specified masking). The address match could be based on the storage address of the program instruction concerned and/or a target address being accessed by the program instruction. When an address match is found, then step 46 determines whether the instruction is one marked as meeting the address match criteria (assuming the address match is being made upon target addresses for instructions that have already been dispatched). If the instruction is so marked, then step 48 records the address match within the sampled instruction record.

Figure 4:
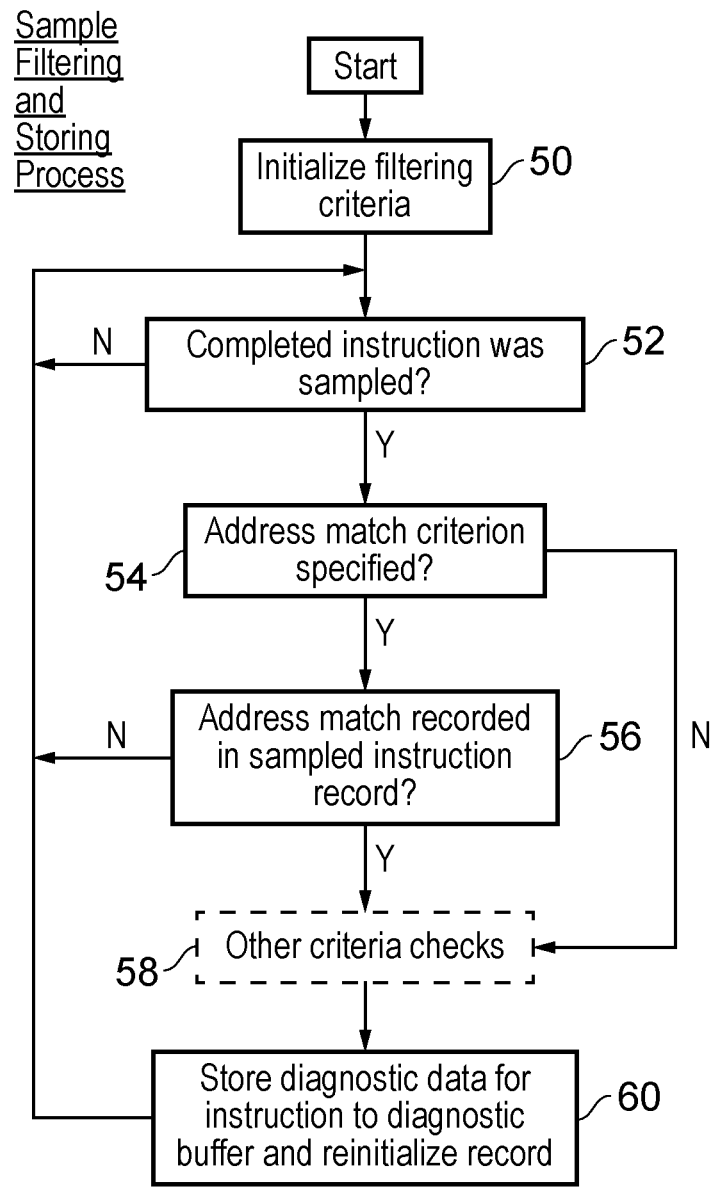
FIG. 4 is a flow diagram schematically illustrating a sample filtering and storing process.

FIG. 4 schematically illustrates a sample filtering and storing process. At step 50 the criteria to be used in examination of the sampled instruction record to gate sampling are initialized. Step 52 determines whether a completed instruction is marked as meeting the sample interval criteria within its associated sample instruction record. If the instruction does not meet this criteria, then no diagnostic data is stored for that instruction. If the criteria of the sampling interval is met, then processing proceeds to step 54 where a determination is made as to whether or not the address match criteria is to be applied. If the address match criteria is to be applied, then step 56 determines whether or not the sampled instruction record for the instruction that is completed is marked as having met the address match criteria. If the address match criteria is not met, then no diagnostic data will be stored.

Step 58 schematically represents other criteria checks which may be made in respect of a completed instruction to determine whether or not it is to have diagnostic data associated therewith stored into the diagnostic data buffer 12. These other criteria may go beyond the sampling interval check and the address match check described herein. If all of the criteria are met, then processing proceeds to step 60 where diagnostic data for the completed instruction is stored into the diagnostic data buffer and the sampled instruction record cleared for reuse by another instruction. There may also be checks on the N path from step 56 such that diagnostic data for the completed instruction is stored into the diagnostic data buffer if any of the criteria are met.

Figure 5:
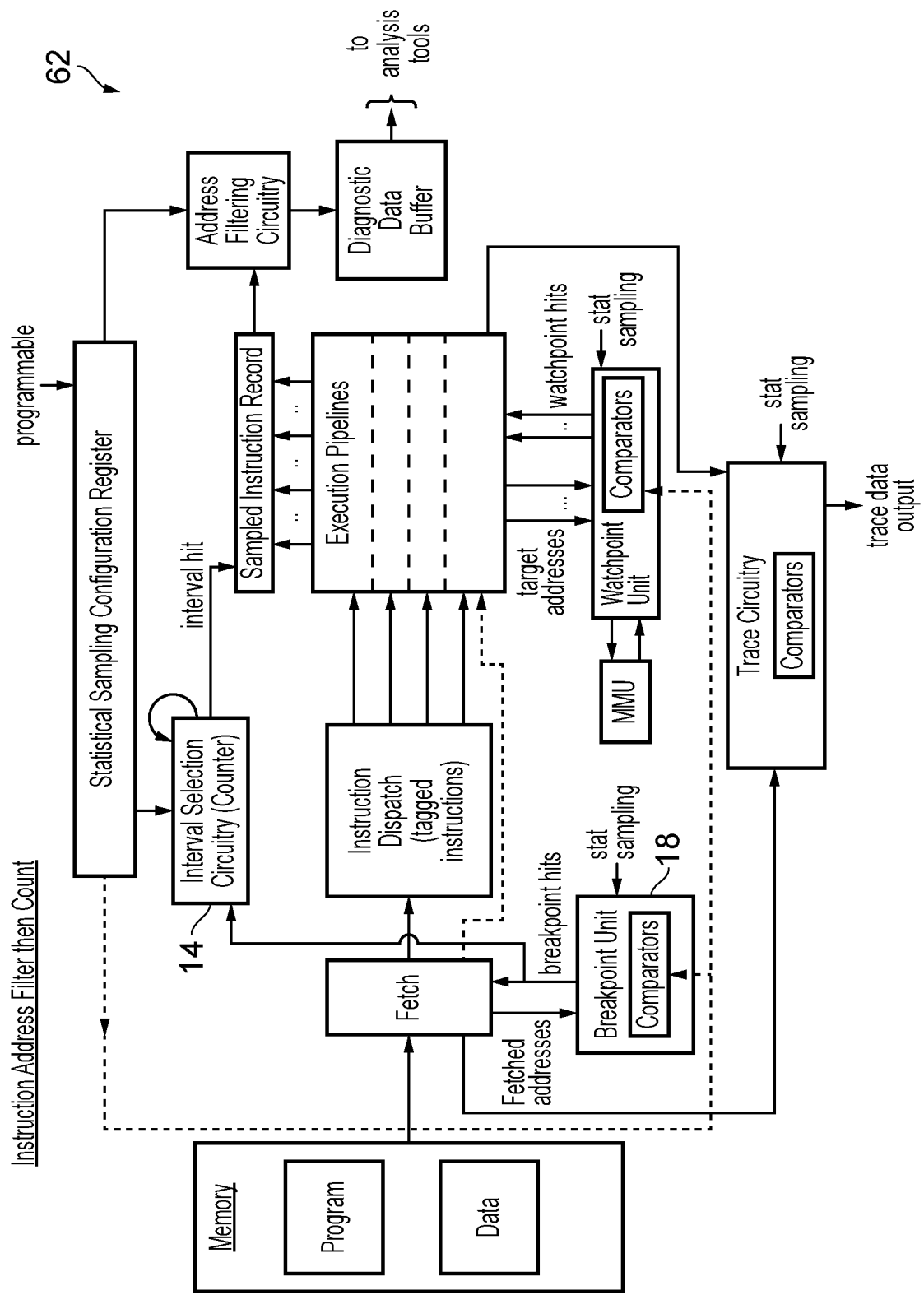
FIG. 5 schematically illustrate a further example embodiment of a data processing system incorporating diagnostic data capture circuitry.

FIG. 5 illustrates another example embodiment of a data processing system 62 using statistical sampling. In this example embodiment, circuit elements similar to those described in relation to FIG. 1 will not be described again. The example embodiment of FIG. 5 differs from that of FIG. 1 in that the address filtering criteria is performed based upon the instruction address of a program instruction. The breakpoint unit 18 identifies a stream of candidate program instructions for diagnostic data recording as part of statistical sampling. The stream of candidate program instructions are those instructions for which the address match criteria has been met based upon their instruction address. The interval selection circuitry 14 then counts a (programmable) sampling interval within the stream of candidate program instructions which already match the address criteria. When the interval count reaches zero, then the candidate program instruction at that point is marked as to be sampled. Accordingly, when that instruction is completed it's associated diagnostic data will be stored. The example embodiment of FIG. 5 thus performs an address filtering operation followed by an interval selection upon those program instructions that meet the address filtering criteria.

The invention claimed is:

1. Apparatus for processing data, comprising:
a memory configured to store program instructions and data;
execution pipelines configured to execute the program instructions to perform processing operations and to manipulate data;
sampling circuitry configured to sample processing operations in a stream of processing operations in the execution pipelines and produce sampled processing operation data;
a diagnostic data buffer configured to store the sampled processing operation data;
diagnostic data capture circuitry comprising:
address filtering circuitry configured to select as a candidate processing operation for sampling a processing operation within said stream of processing operations in the execution pipelines having an associated memory address matching a predetermined address characteristic to form a stream of candidate operations; and
interval selection circuitry configured to control storing of data processing data characterizing said candidate processing operation in said diagnostic data buffer when said candidate processing operation is separated by a predetermined interval within said stream of candidate processing operations from a previously sampled processing operation; and
further diagnostic circuitry configured to:
perform a further diagnostic operation associated with execution of said stream of processing operations, wherein said address filtering circuitry shares diagnostic comparator circuitry with said further diagnostic circuitry to perform address comparisons, and
suppress said further diagnostic operation upon detection of an address match by said diagnostic comparator circuitry and instead to generate a suppressed address-match event, wherein a predetermined filter characteristic of the address filtering circuitry includes occurrence of said suppressed address-match event,
wherein the diagnostic data capture circuitry is configured to:
automatically detect that (i) a sampled processing operation is separated by a predetermined interval from a preceding sampled processing operation within said stream of processing operations in the execution pipelines for which corresponding preceding sampled processing operation data were stored in said diagnostic data buffer, and (ii) said sampled processing operation also has an associated memory address that matches a predetermined address characteristic, said predetermined address characteristic is part of a capability pointer comprising a pointer to a region of the memory and permitted operations when using said pointer;
automatically detect that (iii) said sampled processing operation is not separated from said preceding sampled processing operation by said predetermined interval or (iv) said sampled processing operation does not have said associated memory address that matches said predetermined address characteristic; and
in response to detection of (i) and (ii), store in the diagnostic data buffer sampled processing operation data characterizing the sampled processing operation within the execution pipelines, and, in response to detection of (iii) or (iv), not store in said diagnostic data buffer the sampled processing operation data characterizing said sampled processing operation.

2. Apparatus as claimed in claim 1, wherein said diagnostic data capture circuitry comprises:
interval selection circuitry configured to select as a candidate processing operation for sampling a processing operation within said stream of processing operations in the execution pipelines separated by the predetermined interval within said stream from a previously selected candidate processing operation; and
address filtering circuitry configured to control storing of data processing data characterizing said candidate processing operation in said diagnostic data buffer as said sampled data processing data when said candidate processing operation has an associated memory address matching said predetermined address characteristic.

3. Apparatus as claimed in claim 2, wherein said candidate processing operation is a data access processing operation to access a target memory address and said associated memory address is said target memory address.

4. Apparatus as claimed in claim 2, wherein said candidate processing operation is stored at an operation address and said associated memory address is said operation address.

5. Apparatus as claimed in claim 1, wherein said associated memory address matching said predetermined address characteristic includes:
said associated memory address matches a predetermined address;
said associated memory address matches a predetermined range of addresses; and
bits within said associated memory address specified by a mask match corresponding bits within a predetermined address.

6. Apparatus as claimed in claim 2, wherein said predetermined interval is one of:
a predetermined number of processing operations; and
a predetermined time interval.

7. Apparatus as claimed in claim 1, wherein said predetermined address characteristic is user programmable.

8. Apparatus as claimed in claim 1, wherein said address filtering circuitry is configured to selectively include occurrence of said suppressed address-match event within characteristic.

9. Apparatus as claimed in claim 1, wherein said further diagnostic circuitry comprises watchpoint circuitry configured to trigger an interruption to processing operation execution when a data access is made to a memory address matching a watchpoint characteristic and said diagnostic comparator circuitry comprises a watchpoint comparator shared with said address filtering circuitry.

10. Apparatus as claimed in claim 1, wherein said further diagnostic circuitry comprises breakpoint circuitry configured to trigger an interruption to processing operation execution when a processing operation is executed having an operation address matching a breakpoint characteristic and said diagnostic comparator circuitry comprises a breakpoint comparator shared with said address filtering circuitry.

11. Apparatus as claimed in claim 1, wherein said further diagnostic circuitry comprises trace circuitry configured to generate trace data indicative of processing operation execution flow and said diagnostic comparator circuitry comprises a trace point comparator shared with said address filtering circuitry.

12. Apparatus as claimed in claim 1, comprising memory management circuitry configured to manage accesses to a memory using memory address attribute data indicative of memory attributes associated with regions of memory addresses within said memory, wherein said predetermined address characteristic of said associated memory address corresponds to a parameter specified in said memory address attribute data for said associated memory address.

13. Apparatus as claimed in claim 12, wherein said memory address attribute data is memory page table data.

14. A method of processing data in an apparatus including a memory configured to store program instructions and data; execution pipelines configured to execute the program instructions to perform processing operations and to manipulate data; sampling circuitry configured to sample processing operations in a stream of processing operations in the execution pipelines and produce sampled processing operation data; a diagnostic data buffer configured to store the sampled processing operation data; diagnostic data capture circuitry comprising address filtering circuitry configured to select as a candidate processing operation for sampling a processing operation within said stream of processing operations in the execution pipelines having an associated memory address matching a predetermined address characteristic to form a stream of candidate operations; and interval selection circuitry configured to control storing of data processing data characterizing said candidate processing operation in said diagnostic data buffer when said candidate processing operation is separated by a predetermined interval within said stream of candidate processing operations from a previously sampled processing operation; and further diagnostic circuitry configured to perform a further diagnostic operation associated with execution of said stream of processing operations, wherein said address filtering circuitry shares diagnostic comparator circuitry with said further diagnostic circuitry to perform address comparisons, suppress said further diagnostic operation upon detection of an address match by said diagnostic comparator circuitry and instead to generate a suppressed address-match event, wherein a predetermined filter characteristic of the address filtering circuitry includes occurrence of the suppressed address-match event, the diagnostic data capture circuitry performing the method comprising:

automatically detecting that (i) a sampled processing operation is separated by a predetermined interval from a preceding sampled processing operation within said stream of processing operations for which corresponding preceding sampled data processing data were stored in said diagnostic data buffer, and (ii) said sampled processing operation also has an associated memory address that matches a predetermined address characteristic, wherein said predetermined address characteristic is part of a capability pointer comprising a pointer to a region of the memory and permitted operations when using said pointer; and automatically detecting that (iii) said sampled processing operation is not separated from said preceding sampled processing operation by said predetermined interval or (iv) said sampled processing operation does not have said associated memory address that matches said predetermined address characteristic; and in response to detection of (i) and (ii), storing in the diagnostic data buffer sampled processing operation data characterizing the sampled processing operation within the execution pipelines, and, in response to detecting (iii) or (iv), not storing in said diagnostic data buffer the sampled data processing data characterizing said sampled processing operation.

\* \* \* \* \*